United States Patent
Song et al.

(10) Patent No.: US 9,412,992 B2
(45) Date of Patent: Aug. 9, 2016

(54) RECHARGEABLE BATTERY

(71) Applicant: SAMSUNG SDI CO., LTD., Yongin-si, Gyeonggi-do (KR)

(72) Inventors: Jang-Hyun Song, Yongin-si (KR); Yong-Sam Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 23 days.

(21) Appl. No.: 14/227,223

(22) Filed: Mar. 27, 2014

(65) Prior Publication Data

US 2014/0356700 A1     Dec. 4, 2014

Related U.S. Application Data

(60) Provisional application No. 61/828,029, filed on May 28, 2013.

(51) Int. Cl.

| | |
|---|---|
| *H01M 2/30* | (2006.01) |
| *H01M 2/06* | (2006.01) |
| *H01M 2/02* | (2006.01) |
| *H01M 2/04* | (2006.01) |
| *H01M 10/0525* | (2010.01) |
| *H01M 10/6553* | (2014.01) |

(52) U.S. Cl.
CPC ........ *H01M 2/30* (2013.01); *H01M 2/06* (2013.01); *H01M 2/0277* (2013.01); *H01M 2/0287* (2013.01); *H01M 2/0404* (2013.01); *H01M 2/0473* (2013.01); *H01M 10/0525* (2013.01); *Y02T 10/7011* (2013.01)

(58) Field of Classification Search
CPC ... H01M 2/202; H01M 10/6553; H01M 2/30; H01M 2/06; H01M 2/0277; H01M 2/0287; H01M 2/0404; H01M 2/0473; H01M 10/0525; Y02T 10/7011
See application file for complete search history.

(56) References Cited

U.S. PATENT DOCUMENTS 8,038,487 B2 * 10/2011 Tsuchiya et al. ............. 439/765
8,349,488 B2   1/2013 Seo et al.
(Continued)

FOREIGN PATENT DOCUMENTS

JP    2007-234586    9/2007
KR    10-2011-0134259    12/2011

*Primary Examiner* — Edu E Enin-Okut
*Assistant Examiner* — Brian Ohara
(74) *Attorney, Agent, or Firm* — Lee & Morse, P.C.

(57) ABSTRACT

A rechargeable battery includes a case, a cap plate coupled with the case, a terminal passing though a terminal hole in the cap plate, the terminal hole, and a sealing member in the terminal hole partially enclosing the terminal. The terminal includes an upper connecting part extending outside the case from a middle connecting part, and a current collector connecting part extending inside the case from the middle connecting part. The sealing member includes an upper sealing part seated on the cap plate and a lower sealing part disposed in and affixed to the terminal hole in a sealing relationship with respect thereto, the upper sealing part being between the cap plate and the upper connecting part to support the upper connecting part in a spaced apart relationship with the cap plate, the lower sealing part being between the current collector connecting part and an entirety of the terminal hole.

14 Claims, 7 Drawing Sheets

(56) References Cited

U.S. PATENT DOCUMENTS

| | | |
|---|---|---|
| 2007/0202364 A1 | 8/2007 | Uh et al. |
| 2008/0038628 A1* | 2/2008 | Yamauchi et al. ............... 429/56 |
| 2011/0076553 A1* | 3/2011 | Kameda et al. ............... 429/181 |
| 2011/0300414 A1 | 12/2011 | Baek |
| 2012/0052370 A1* | 3/2012 | Moon ........................... 429/179 |
| 2012/0156548 A1 | 6/2012 | Kim |
| 2013/0108916 A1* | 5/2013 | Song ..................... H01M 2/305 |
| | | 429/179 |

* cited by examiner

RECHARGEABLE BATTERY

CROSS-REFERENCE TO RELATED APPLICATION

The present application claims priority under 35 U.S.C. §119 to U.S. Provisional Application No. 61/828,029, filed on May 28, 2013, and entitled: "Rechargeable Battery," which is incorporated herein by reference in its entirety.

BACKGROUND

1. Field

The described technology relates generally to a rechargeable battery, and more particularly, to a rechargeable battery having an improved terminal structure.

2. Description of the Related Art

Rechargeable batteries are batteries that can be rechargeable and dischargeable, unlike primary batteries that cannot be recharged. Low-capacity rechargeable batteries are used for small portable electronic devices such as mobile phones, laptop computers, and camcorders. Large-capacity chargeable batteries are widely used as power supplies for driving motors for hybrid cars or the like.

Recently, high-output rechargeable batteries using a non-aqueous electrolyte with high energy density have been developed. The high-output rechargeable batteries are configured of large-capacity battery modules in which a plurality of rechargeable batteries are connected to each other in series so as to be used for driving motors for devices requiring large power, for example, electric cars, or the like.

SUMMARY

Embodiments are directed to a rechargeable battery including a case having an electrode assembly therein, a cap plate coupled with the case, a terminal that passes though a terminal hole in the cap plate, the terminal hole having a length in a first direction, and a sealing member in the terminal hole, the sealing member partially enclosing the terminal. The terminal includes an upper connecting part that extends outside the case from a middle connecting part to partially overlap the cap plate outside the case, and a current collector connecting part extending from the middle connecting part in the first direction inside the case. The sealing member includes an upper sealing part seated on the cap plate and a lower sealing part disposed in and affixed of the terminal hole in a sealing relationship with respect thereto, the upper sealing part being between the cap plate and the upper connecting part to support the upper connecting part in a spaced apart relationship with the cap plate, the lower sealing part being between the current collector connecting part and an entirety of the terminal hole.

The upper sealing part may isolate and electrically insulate the upper connecting part from the cap plate.

The current collector connecting part may have a length in the first direction that is less than the length of the terminal hole such that the current collector connecting part does not overlap the cap plate.

The length of the current collector connecting part may be about 60% to about 95% of the length of the terminal hole.

The terminal hole may have an elongated configuration in the first direction. The current collector connecting part may be positioned under the terminal hole.

The rechargeable battery may further include a block part on an inside of the terminal hole and a supporting part in the sealing member, the supporting part being fitted and coupled with the block part.

The block part may include a protrusion and the supporting part may include a groove into which the block part is inserted.

The block part may include a groove and the supporting part may include a protrusion that is inserted into the groove.

The block part may have a concave-convex shape in which a concave portion and a convex portion are alternately disposed, the concave-convex shape being formed along an inner circumferential surface of the terminal hole, and the supporting part has a concave-convex shape that is inserted into the block part.

The block part and the supporting part may mesh with each other in a serrated, toothed or zigzag configuration.

The sealing member may include an upper sealing part between the upper connecting part and the cap plate and a lower sealing part inserted and fixed into the terminal hole formed in the cap plate. The supporting part may be formed at a circumference of the lower sealing part.

The lower sealing part may include a hole through which the middle connecting part extends. A lower surface of the lower sealing part may include a seating groove into which the current collector connecting part is inserted alongside the terminal hole.

The sealing member may be one piece.

The sealing member may be formed by insert injection.

The middle connecting part of the terminal may pass through the terminal hole. The upper connecting part may be connected to the middle connecting part through a bent portion. The current collector connecting part is connected to the middle connecting part through another bent portion.

The upper connecting part and the current collector connecting part may be parallel to the cap plate.

The upper connecting part may extend toward a center of the cap plate from the middle connecting part. The current collector connecting part may extend in the first direction toward a side end of the cap plate from the middle connecting part.

The current collector connecting part may be connected to the electrode assembly via a current collector member. A lower surface of the current collector connecting part may include a protrusion that is insertable into the current collector member.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
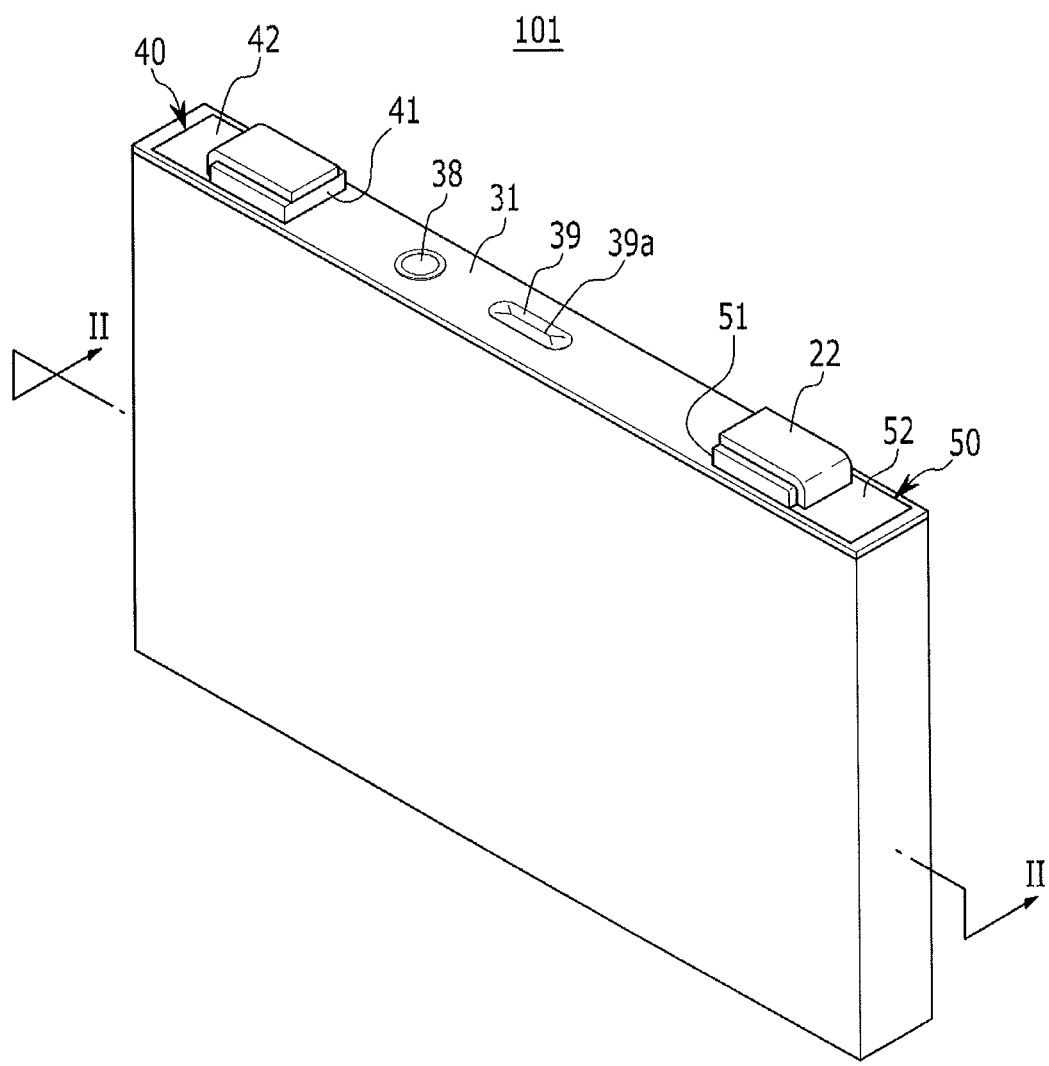
FIG. 1 illustrates a perspective view showing a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
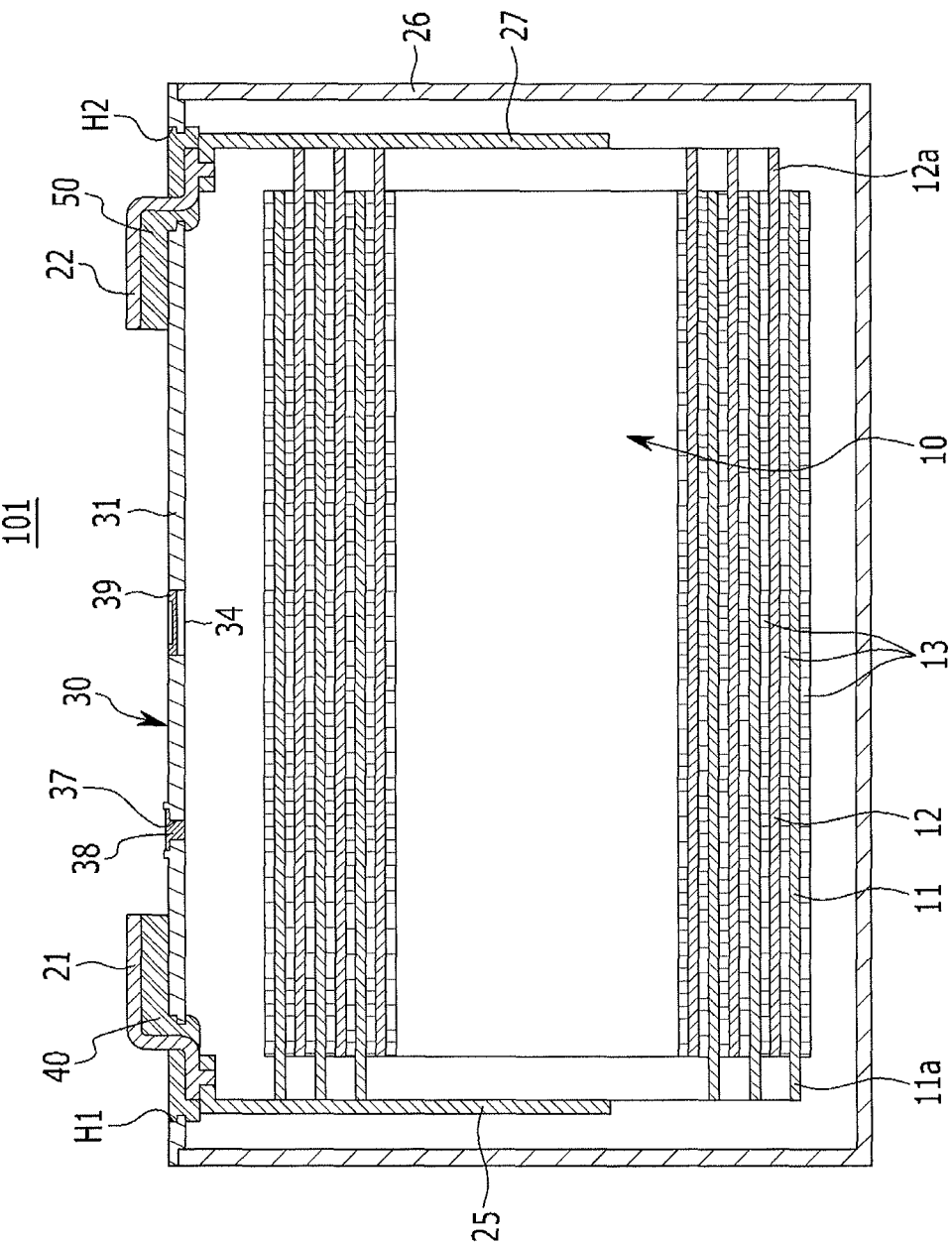
FIG. 2 illustrates a cross-sectional view taken along line II-II of FIG. 1.

FIG. 1 illustrates a perspective view showing a rechargeable battery according to an exemplary embodiment and FIG. 2 illustrates a cross-sectional view taken along line II-II in FIG. 1.

Referring to FIGS. 1 and 2, a rechargeable battery 101 according to an exemplary embodiment includes an electrode assembly 10 stacked by interposing a separator 13 between a positive electrode 11 and a negative electrode 12, a case 26 in which the electrode assembly 10 is installed, and a cap assembly 30 coupled with an opening of the case 26.

The rechargeable battery 101 according to this exemplary embodiment may be a lithium ion rechargeable battery. Herein, a square rechargeable battery will be described by way of example. In other implementations, the battery may be one of various shapes or types, such as a lithium polymer battery, a cylindrical battery, etc.

The positive electrode 11 and the negative electrode 12 may each include a coating part where an active material is coated on a surface of a current collector formed of a thin metal foil, and an uncoated part where the active material is not coated thereon.

The positive electrode uncoated part 11a may be formed on a side end of the positive electrode 11 in a length direction of the positive electrode 11. The negative electrode uncoated part 12a may be formed on an opposite side end in a length direction of the negative electrode 12. Moreover, the positive electrode 11 and the negative electrode 12 may be stacked after interposing a separator, which is an insulator, therebetween.

In some implementations, electrode assembly 10 may be formed in a wound structure, having the separator between the positive electrode and the negative electrode formed of a plurality of sheets.

The case 26 may be formed in an approximately rectangular parallelepiped shape, and one surface thereof is provided with an opening. The cap assembly 30 may include a cap plate 31 covering the opening of the case 26, a first terminal 21 disposed on the cap plate 31 and electrically connected with the positive electrode 11, a second terminal 22 disposed on the cap plate 31 and electrically connected with the negative electrode 12, and a vent member 39 having a notch 39a formed therein so as to be fractured according to a set internal pressure. The vent member 39 may be installed so as to cover a vent hole 34 formed in the cap plate 31.

The cap plate 31 may be formed of a thin metal plate and may have an electrolyte inlet 37 formed at one side thereof. The cap plate 31 may be provided with a sealing closure 38 fixedly installed to seal the electrolyte inlet 37.

The first terminal 21 and the second terminal 22 may be installed to pass through terminal holes H1 and H2 formed in the cap plate 31 and may be electrically connected to the electrode assembly 10. The first terminal 21 may be installed to electrically connect with the positive electrode 11. The first terminal 21 may be electrically connected with the positive electrode 11 via a current collector member 25. The first terminal 21 may be provided with a sealing member 40 partially enclosing the first terminal 21.

The second terminal 22 may be installed to electrically connect with the negative electrode 12. The second terminal 22 may be electrically connected with the negative electrode 12 via the current collector member 27. The second terminal 22 may be provided with the sealing member 50 partially enclosing a portion of the second terminal 22.

Figure 3:
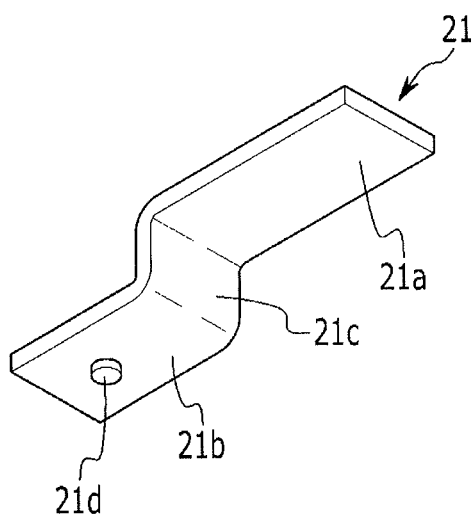
FIG. 3 illustrates a perspective view of a terminal according to the exemplary embodiment.
Figure 4:
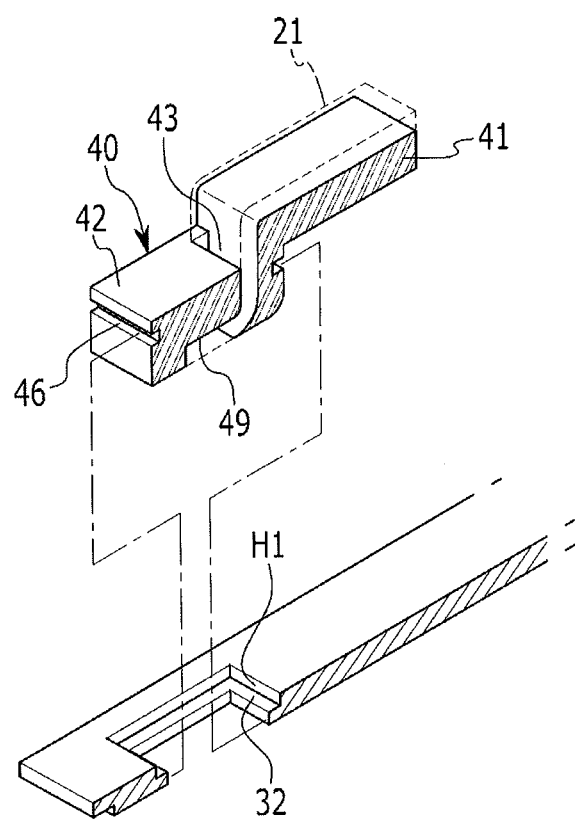
FIG. 4 illustrates exploded perspective view showing to cut-way a cap plate and a sealing member according to the exemplary embodiment.

FIG. 3 illustrates a perspective view of a terminal according to the exemplary embodiment and FIG. 4 illustrates an exploded perspective cut-away view showing a cap plate and a sealing member according to this exemplary embodiment.

Referring to FIGS. 3 and 4, a second terminal 22 and members coupled with the second terminal 22 may be formed in a symmetrical structure with respect to a first terminal 21 and members coupled with the first terminal 21. Thus, a detailed description of the first terminal 21 and members coupled with the first terminal 21 will also supply a detailed description of the second terminal 22 and members coupled with the second terminal 22.

The first terminal 21 may be formed from a plate-shaped structure. The first terminal 21 may include an upper connecting part 21a positioned on an outer side of the case 26, a current collector connecting part 21b inserted in the case 26 and coupled with the current collector member 25, and a middle connecting part 21c that is bent between the upper connecting part 21a and the current collector connecting part 21b.

The upper connecting part 21a may be disposed to be parallel with the cap plate 31 over an upper portion of the cap plate 31. The upper connecting part 21a may be formed to extend toward a center of the cap plate 31 from the middle connecting part 21c.

The current collector connecting part 21b may be disposed to be parallel with the cap plate 31 underneath the cap plate 31. A current collector protrusion 21d that is fitted into the current collector member 25 may be formed on the lower surface of the current collector connecting part 21b. The current collector protrusion 21d may be fixed to the current collector member 25 by welding. The current collector connecting part 21b may extend toward a side end of the cap plate 31 from the middle connecting part 21c. As described above, the upper connecting part 21a and the current collector connecting part 21b may be formed to extend in opposite directions from each other from the middle connecting part 21c.

The middle connecting part 21c may be bent at an approximately perpendicular angle between the upper connecting part 21a and the current collector connecting part 21b to connect the upper connecting part 21a with the current collector connecting part 21b. The middle connecting part 21c may be inserted into a hole 43 formed in the sealing member 40. In addition, the middle connecting part 21c may be inserted to pass through the cap plate 31.

The upper connecting part 21a and the current collector connecting part 21b may be disposed to be parallel with the cap plate 31, and the middle connecting part 21c may be vertically disposed with respect to the upper connecting part 21a and the current collector connecting part 21b.

The sealing member 40 may include an upper sealing part 41 seated on the cap plate 31 and a lower sealing part 42 inserted into and fixed to a terminal hole H1 formed in the cap plate 31. The upper sealing part 41 may be positioned between a lower surface of the upper connecting part 21a and the upper surface of the cap plate 31. The upper sealing part 41 may support the upper connecting part 21a to be spaced apart from the cap plate 31. In addition, the upper sealing part 41 may serve to insulate the cap plate 31 and the upper connecting part 21a from each other.

The lower sealing part 42 may include the terminal hole 43 into which the middle connecting part 21c is inserted. A lower surface of the lower sealing part 42 may include a seating groove 49 into which the current collector connecting part 21b is inserted along the terminal hole 43.

A protruding block part 32 may be formed on the terminal hole H1 of the cap plate. A supporting part 46 in the lower sealing part 42 may be fitted into and coupled with the block part 32. The block part 32 may be formed as a protrusion and may be formed circumferentially on an inner peripheral surface of the terminal hole H1. The supporting part 46 may be formed as a groove into which the block part 32 is inserted and may be formed along the circumference of the lower sealing part 42.

When the block part 32 and the supporting part 46 are formed, a contact area of the inside of the terminal hole H1 and the sealing member 40 may be increased. Accordingly, the sealing performance of the sealing member 40 may be improved. In addition, if moisture were to infiltrate between the cap plate 31 and the sealing member 40, the block part 32 and the supporting part 46 may prevent the moisture from infiltrating any further.

The sealing member 40 may be formed by an insert molding method in a state in which the first terminal 21 is installed on the cap plate 31. The sealing member 40 may be fixedly installed in the cap plate 31 simultaneously with being formed and may be stably fixed on the cap plate 31 enclosing the first terminal 21.

Similarly to the first terminal 21, the second terminal 22 may include an upper connecting part positioned over an upper portion of the cap plate 31, a current collector connecting part inserted into the case 26 and coupled with a current collector member 27, and a middle connecting part that is bent between the upper connecting part and the current collector connecting part. In addition, the second terminal 22 may be provided with the sealing member 50 that is inserted into the terminal hole H2 to support the second terminal 22. The sealing member 50 may be formed by the insert molding method in a state in which the second terminal 22 is installed on the cap plate 31.

Figure 5:
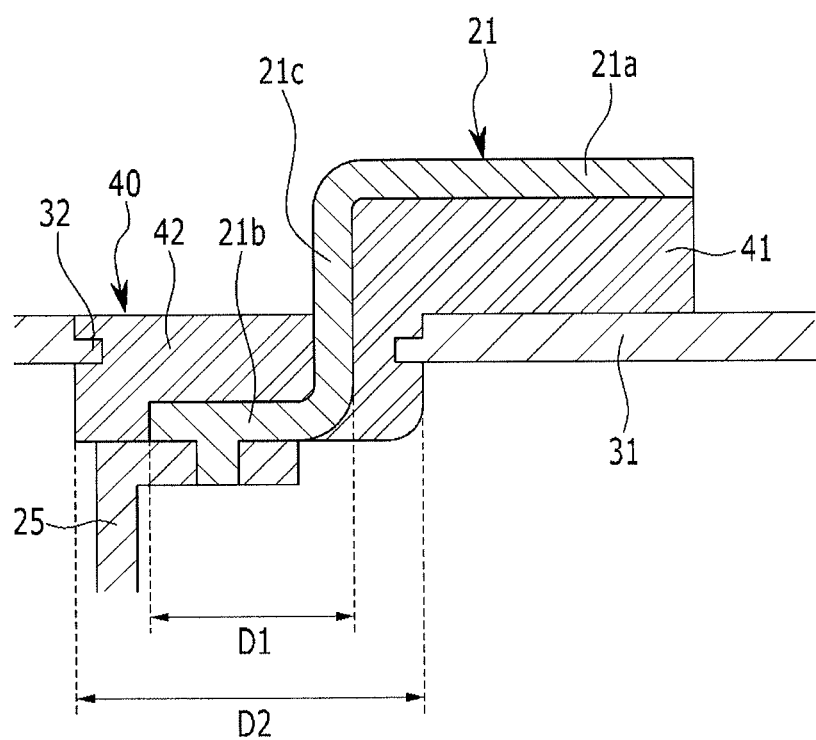
FIG. 5 illustrates an enlarged cross-sectional view showing a portion of the rechargeable battery according to the exemplary embodiment.

As shown in FIG. 5, a current collector connecting part 21b may have a length D1 in a first direction that is smaller than a length D2 of the terminal hole H1 in the first direction. The terminal hole H1 may have a longish rectangular cross section in the first direction, and the current collector connecting part 21b may be positioned under the terminal hole. The length D1 of the current collector connecting part 21b may be about 60% to about 95% of the length D2 of the terminal hole H1.

The current collector connecting part 21b may have a length D1 that is smaller than the length D2 of the terminal hole H1. Thereby, it may be possible to prevent or reduce the likelihood of the current collector connecting part 21b and the cap plate 31 being short-circuited. If the current collector connecting part 21b were to have a length longer than that of the terminal hole H1, the current collector connecting part 21b would be positioned under the cap plate 31. If a foreign material such as water or the like were to infiltrate into a gap between the sealing member 40 and the cap plate 31, a short circuit could be caused between the current collector connecting part 21b and the cap plate 31 due to the foreign material. According to the exemplary embodiment, the current collector connecting part 21b may be positioned only under the terminal hole H1, and may not overlap the cap plate 31. Accordingly, it may be possible to prevent or reduce the likelihood of a short circuit between the cap plate 31 and the current collector connecting part 21b if these become water-soaked.

In addition, the upper connecting part 21a may have a length longer than that of the current collector connecting part 21b. The length of the upper connecting part 21a may be about 1.2 times to about 3 times that of the current collector connecting part 21b. Therefore, the center of gravity of the positive electrode terminal 21 may be inclined toward the upper connecting part 21a and the upper connecting part 21a may pressurize the upper surface of the cap plate 31 to be stably fixed thereto.

Figure 6:
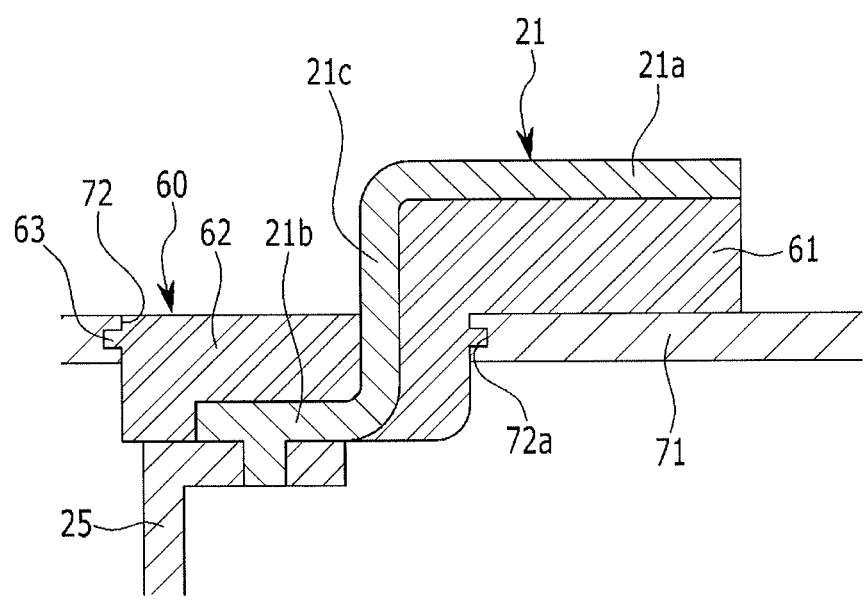
FIG. 6 illustrates an enlarged cross-sectional view showing a portion of the rechargeable battery according to another exemplary embodiment.

FIG. 6 illustrates an enlarged cross-sectional view showing a portion of the rechargeable battery according to another exemplary embodiment.

The rechargeable battery according to this exemplary embodiment has the same structure as the rechargeable battery according to the previous embodiment except for a structure of a cap plate 71 and a sealing member 60 and therefore, the description of same structures will not be repeated.

The cap plate 71 according to the exemplary embodiment may be provided with a terminal hole 72. The terminal hole 72 may have a first terminal 21 and a sealing member 60 insertedly installed therein.

The first terminal 21 may include an upper connecting part 21a positioned on an outer side of the case, a current collector connecting part 21b inserted in the case, and a middle connecting part 21c that is bent between the upper connecting part 21a and the current collector connecting part 21b.

The sealing member 60 may include an upper sealing part 61 seated on the cap plate 71 and a lower sealing part 62 inserted into and fixed to a terminal hole 72. The upper sealing part 61 may be positioned between the lower surface of the upper connecting part 21a and the upper surface of the cap plate 71 and may support the upper connecting part 21a to be spaced apart from the cap plate 71. The sealing member 60 may be formed by an insert molding method in a state in which the first terminal 21 is installed on the cap plate 71. Therefore, the sealing member 60 may be fixedly installed into the cap plate 71 simultaneously with being formed and may be stably fixed on the cap plate 71 enclosing the first terminal 21.

A block part 72a having a concave groove may be formed in the terminal hole 72. A supporting part 63 may be formed on the lower sealing part 62 and fitted into and coupled with the block part 72a. The block part 72a may be formed circumferentially in an inner peripheral surface of the terminal hole 72. The supporting part 63 may be formed as a protrusion that is inserted into the block part 32 and is formed along a circumference of the lower sealing part 62.

When the groove shaped block part 72a and the protrusion shaped supporting part 73 of a are provided, a contact area of the inside of the terminal hole 72 and the sealing member 60 may be increased, thereby improving the sealing performance. In addition, if moisture were infiltrate between the cap plate 71 and the sealing member 60, the block part 72a and the supporting part 63 may prevent the moisture from infiltrating further.

Figure 7:
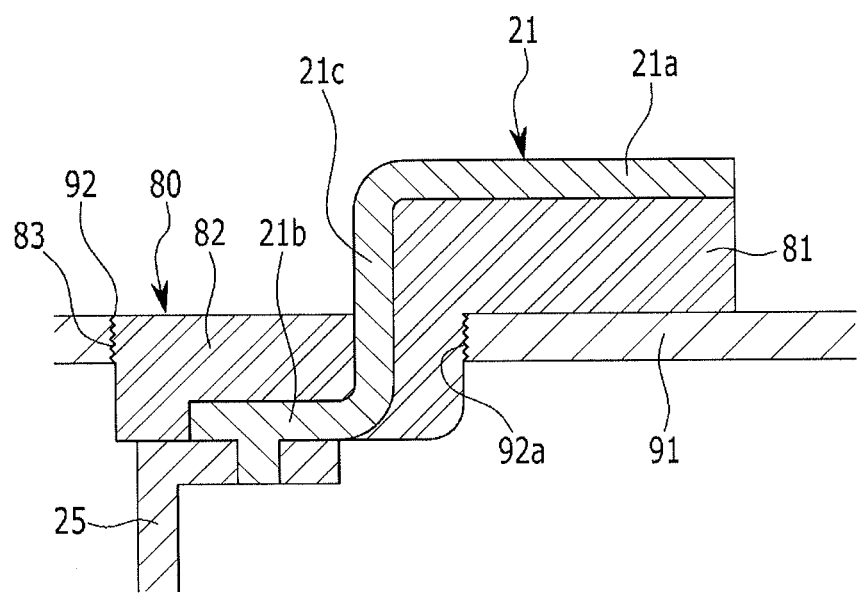
FIG. 7 illustrates an enlarged cross-sectional view showing a portion of the rechargeable battery according to another exemplary embodiment.

FIG. 7 illustrates an enlarged cross-sectional view showing a portion of the rechargeable battery according to another exemplary embodiment.

The rechargeable battery according to this exemplary embodiment has the same structure as the embodiments illustrated in FIGS. 1-5 and 6, except for a structure of a cap plate 91 and a sealing member 80. Therefore, a description of the same structures will not be repeated.

The cap plate 91 according to the exemplary embodiment may be provided with a terminal hole 92. The terminal hole 92 may have a first terminal 21 and a sealing member 80 insertedly installed therein.

The first terminal 21 may include an upper connecting part 21a positioned on an outer side of a case, a current collector connecting part 21b inserted in the case, and a middle connecting part 21c that is bent between the upper connecting part 21a and the current collector connecting part 21b.

The sealing member 80 may include an upper sealing part 81 seated on the cap plate 91 and a lower sealing part 82 inserted into and fixed to a terminal hole 92. The upper sealing part 81 may be positioned between the lower surface of the upper connecting part 21a and the upper surface of the cap plate 91 and may support the upper connecting part 21a to be spaced apart from the cap plate 91.

The terminal hole 92 may be provided with the block part 92a formed in a concave-convex shape in which a concave portion and a convex portion are alternately disposed. The block part 92a may have a serrated, toothed or zigzag configuration in a lengthwise vertical cross-section through the battery, as shown in FIG. 7. The lower sealing part 82 is provided with the supporting part 83 fitted into and coupled with the block part 92a. The block part 92a may be formed circumferentially in an inner peripheral surface of the terminal hole 92. The supporting part 83 may be formed in a concave-convex shape in which the convex portion and the concave portion inserted into the concave portion and the convex portion of the block part 92a are alternately disposed to each other. The supporting part 83 may have a serrated, toothed or zigzag configuration in a lengthwise vertical cross-section through the battery, as shown in FIG. 7 such that the supporting part 83 meshes with the block part 92a. The supporting part may be formed along a circumference of the lower sealing part 82.

As described above, when the block part 92a having the concave-convex shape and the supporting part 83 having the concave-convex shape fitted into and coupled with the block part 92a are formed, a contact area of the inside of the terminal hole 92 and the sealing member 40 may be increased, thereby improving the sealing performance. In addition, if moisture were to infiltrate into between the cap plate 91 and the sealing member 80, the block part 92a and the supporting part 83 may prevent the moisture from infiltrating further.

By way of summation, review, and context, a battery module may be configured as a plurality of rechargeable batteries interconnected in series. The rechargeable battery may be configured in a cylindrical shape, a square shape, or the like. The rechargeable battery may have a negative electrode terminal and a positive electrode terminal protruding to the outside. The negative electrode terminal and positive electrode terminal may be installed to pass through a cap plate. A sealing member for sealing may be installed between the terminals and the cap plate.

By way of further context, the sealing member may be configured as a gasket in which column shaped terminals are inserted, thereby closely adhering to the terminal and a terminal hole. In order to install the sealing member as described above, an assembling process becomes complicated. In addition, if a defect occurs in the sealing member a sealing performance between the terminals and the cap plate may become deteriorated to leak an electrolyte, or rainwater and the like may infiltrate therebetween to cause a short circuit.

Embodiments provide a rechargeable battery addressing the foregoing considerations and providing improved stability.

According to embodiments, the current collector connecting part has a length shorter than the length of the terminal hole, and the sealing member is inserted into and installed in the terminal hole, thereby improving sealability.

According to embodiments, an inner side of the terminal hole is formed with a block part and the sealing member is formed with a supporting part fitted into and coupled with the block part, thereby improving the sealability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery, comprising:
   a case having an electrode assembly therein;
   a cap plate coupled with the case;
   a terminal that passes through a terminal hole in the cap plate, the terminal hole having a length in a first direction, the terminal being in a form of an elongated plate including a middle connecting part, an upper connecting part and a current collector connecting part, the upper connecting part and the current collector connecting part being bent from the middle connecting part;
   a sealing member in the terminal hole, the sealing member partially enclosing the terminal; and
   a block part on an inside of the terminal hole and a supporting part in the sealing member, the supporting part being fitted and coupled with the block part,
   wherein:
   the middle connecting part extends through the terminal hole in a direction perpendicular to the cap plate, the upper connecting part extends outside the case parallel to the cap plate in the first direction from the middle connecting part to partially overlap the cap plate outside the case, and the current collector connecting part-extends from the middle connecting part parallel to the cap plate in the first direction inside the case, a lower surface of the current collector connecting part including a protrusion extending in a direction away from the cap plate, the protrusion being inserted into a current collector member that connects the terminal with the electrode assembly, and
   the sealing member includes an upper sealing part seated on the cap plate and a lower sealing part disposed in and affixed of the terminal hole in a sealing relationship with respect thereto, the upper sealing part being between the cap plate and the upper connecting part to support the upper connecting part in a spaced apart relationship with the cap plate such that an entire surface of the upper connecting part facing the cap plate directly contacts the upper sealing part, the lower sealing part being between the current collector connecting part and an entirety of the terminal hole.

2. The rechargeable battery as claimed in claim 1, wherein the upper sealing part isolates and electrically insulates the upper connecting part from the cap plate.

3. The rechargeable battery as claimed in claim 1, wherein the current collector connecting part has a length in the first direction less than the length of the terminal hole such that the current collector connecting part does not overlap the cap plate.

4. The rechargeable battery as claimed in claim 3, wherein the length of the current collector connecting part is about 60% to about 95% of the length of the terminal hole.

5. The rechargeable battery as claimed in claim 3, wherein:
the terminal hole has an elongated configuration in the first direction, and
the current collector connecting part is positioned under the terminal hole.

6. The rechargeable battery as claimed in claim 1, wherein:
the block part includes a protrusion, and
the supporting part includes a groove into which the block part is inserted.

7. The rechargeable battery as claimed in claim 1, wherein:
the block part includes a groove, and
the supporting part includes a protrusion that is inserted into the groove.

8. The rechargeable battery as claimed in claim 1, wherein the block part has a concave-convex shape in which a concave portion and a convex portion are alternately disposed, the concave-convex shape being formed along an inner circumferential surface of the terminal hole, and the supporting part has a concave-convex shape that is inserted into the block part.

9. The rechargeable battery as claimed in claim 1, wherein the block part and the supporting part mesh with each other in a serrated, toothed, or zigzag configuration.

10. The rechargeable battery as claimed in claim 1, wherein:
the supporting part in the sealing member is formed at a circumference of the lower sealing part.

11. The rechargeable battery as claimed in claim 10, wherein:
the lower sealing part includes a hole through which the middle connecting part extends, and
a lower surface of the lower sealing part includes a seating groove into which the current collector connecting part is inserted alongside the terminal hole.

12. The rechargeable battery as claimed in claim 11, wherein the sealing member is one piece.

13. The rechargeable battery as claimed in claim 12, wherein the sealing member is formed by insert injection.

14. The rechargeable battery as claimed in claim 1, wherein:
the upper connecting part extends toward a center of the cap plate from the middle connecting part, and
the current collector connecting part extends in the first direction toward a side end of the cap plate from the middle connecting part.

\* \* \* \* \*